(12) United States Patent
Minner et al.

(10) Patent No.: US 6,940,518 B2
(45) Date of Patent: Sep. 6, 2005

(54) SYSTEM AND METHOD FOR EDITING DIGITAL IMAGES USING INDUCTIVE IMAGE GENERATION WITH CACHED STATE-SPECIFIC IMAGE TILES

(75) Inventors: Richard T. Minner, Carmichael, CA (US); Mark Boenke, Santa Rosa, CA (US); Richard Walker, San Francisco, CA (US)

(73) Assignee: Quark Media House SARL, Neuchatel (CH)

( * ) Notice: Subject to any disclaimer, the term of this patent is extended or adjusted under 35 U.S.C. 154(b) by 137 days.

(21) Appl. No.: 09/727,403

(22) Filed: Nov. 30, 2000

(65) Prior Publication Data

US 2002/0063717 A1 May 30, 2002

Related U.S. Application Data

(60) Provisional application No. 60/225,798, filed on Aug. 16, 2000.

(51) Int. Cl.$^7$ .................................................. G09G 5/36
(52) U.S. Cl. ....................................... 345/557; 345/501
(58) Field of Search ................................. 345/501–506, 345/519–520, 522, 530–574, 418; 382/232, 254, 276, 293, 295, 296–300, 302, 305, 309, 311; 709/208, 223, 226, 229, 246, 247

(56) References Cited

U.S. PATENT DOCUMENTS 5,129,013 A * 7/1992 Holzmann et al. .......... 382/276
RE36,145 E * 3/1999 DeAguiar et al. .......... 345/511
5,907,640 A * 5/1999 Delean ....................... 382/276

\* cited by examiner

Primary Examiner—Kee M. Tung
(74) Attorney, Agent, or Firm—Faegre & Benson LLP

(57) ABSTRACT

A system and method using inductive image generation with cached, state-specific image tiles for editing digital images. A computer system contains an archival digital image to be edited and viewed, a transformation state list, describing editing operations to be applied to the archival image in order to produce the current edited image rendition, and a viewing data set, describing the resolution, offset and extent of the current view of the current edited image rendition. The current view is constructed from a set of image tiles kept in a tile cache. In response to an instruction to generate the current view, the system identifies the requisite tiles, and then generates each tile by an inductive image generation process. The latter process comprises (a) ascertaining if the tile is in the tile cache, and, if not (b) ascertaining if the image is unedited and if so obtaining the requisite tile from the image file, and, if not (c) generating the tile by identifying and assembling the requisite supplier tiles in the previous state of the image-editing process and by then applying the current state's editing transformation function to the supplier tiles. The inductive image-generation process is recursive in that in case it is necessary to assemble supplier tiles in the course of the inductive image-generation process then they too are assembled by the process of inductive image generation.

18 Claims, 9 Drawing Sheets

Fig1 Standalone.vsd

Fig2Network.vsd

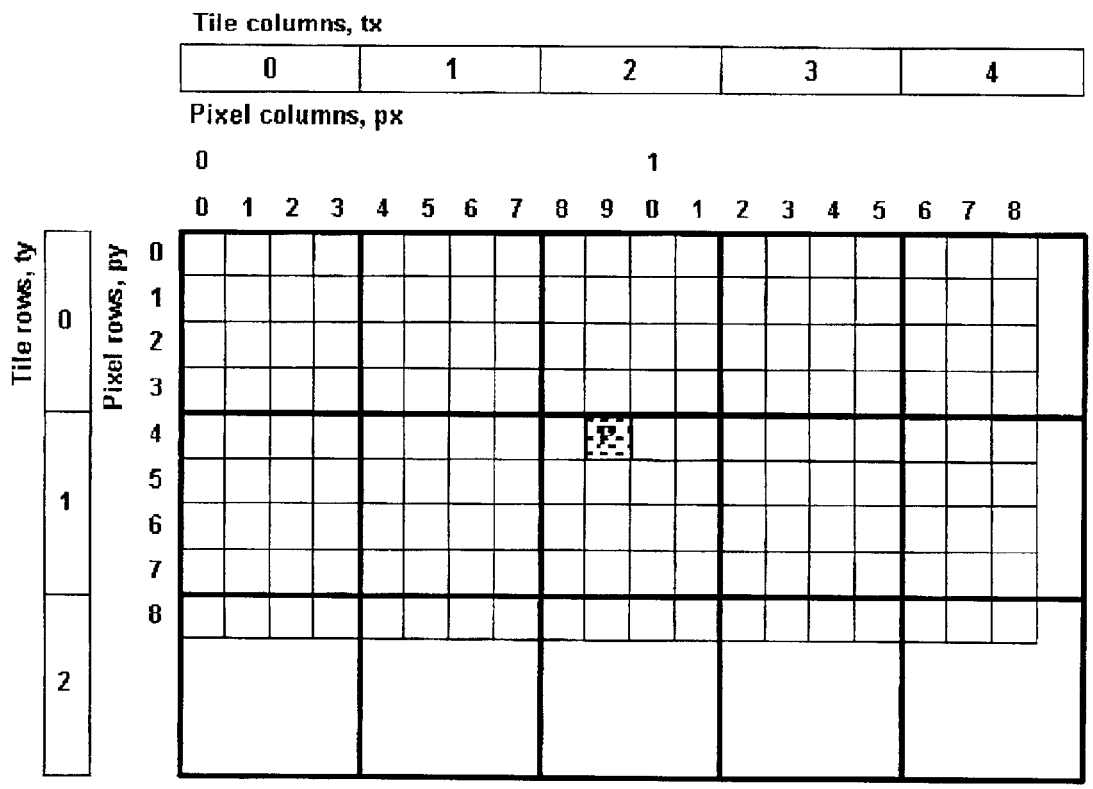

Pixel-Tile Conversion schema

(1) all tiles are of dimension n by n;
(2) the image origin is at the upper left;
(3) the coordinates of the pixel at the origin are (x=0, y=0);
(3) pixels are identified by their (column, row) pair, (x, y), offset from the origin;
(4) the pixel at the top left of the top-left tile is the origin pixel;
(5) tiles are identified by their (column, row) pair, (x, y), offset from the origin;
(6) n = 4;

Then:

the pixel P with coordinates (px, py) is in the tile T with coordinates
(tx, ty) = (px/n, py/n),
where the symbol "/" denotes integer division with the remainder discarded.

The coordinates (rx, ry) of pixel P relative to the origin of tile T are
(rx, ry) = (px%n, py%n),
where the symbol "%" denotes the remainder after integer division.

In the example shown, P has coordinates (px, py) = (9, 4);
hence it lies in tile T with coordinates (tx, ty) = (2, 1), and
its coordinates relative to the origin of that tile are (rx, ry) =(1, 0).

Figure 3
PixelTile.vsd

OverHier.vsd

FlowBasic.vsd

```
100     // Figure 6a
101     GetTiles (state, scale, region)
102     {
103             ListOfTilesToGet = FindTilesIntersecting (state, scale, region);
104             For (all tiles in ListOfTilesToGet)
105                     GetTile (state, scale, x, y);
106     }
107
108     // Figure 6b
109     GetTile (state, scale, x, y)
110     {
111             If (TileIsInCache (state, scale, x, y))
112                     tile = GetTileFromCache (state, scale, x, y);
113             else
114             If (state != 0)
115                     // comment: not the Anchor State
116                     tile = BuildTileFromPriorState (state, scale, x, y);
117             else
118                     // comment: Anchor State 0
119                     tile = GetTileFromFile (scale, x, y);
120             Process (tile);
121     }
122
123     // Figure 6c
124     BuildTileFromPriorState (state, scale, x, y)
125     {
126             region = FindGeneratingRegion (state, scale, x, y);
127             GetTiles (state-1, scale, region);
128             tile = BuildTile (state, scale, x, y);
129             UnlockTiles (state-1, scale, region);
130     }
131
132     // Figure 6d
133     Process (tile)
134     {
135             If (!TileIsInCache (header (tile)))
136                     CacheTile (tile);
137             LockTile (header (tile));
138     }
139
140
```

Figure 6, parts a-d

Fig6code.vsd

```
141     // Figure 6e
142     UnlockTiles (state, scale, region)
143     {
144             ListOfTilesToGet = FindAllTilesIntersecting (state, scale, region);
145             For (all tiles in ListOfTilesToGet)
146                     If (TileIsInCache (state, scale, x, y))
147                             UnlockTile (state, scale, x, y);
148     }
149
150     // Figure 6f
151     CacheTile (tile)
152     {
153             If (!RoomInCache())
154                     PurgeTilesFromCache();
155             AddTileToCache (tile);
156     }
```

Figure 6, parts e-f

Fig6Acode.vsd

FuncHier.vsd

Inductive Image Generation

Rotate.vsd

SYSTEM AND METHOD FOR EDITING DIGITAL IMAGES USING INDUCTIVE IMAGE GENERATION WITH CACHED STATE-SPECIFIC IMAGE TILES

This application claims the benefit of U.S. application No. Ser. 60/225,798, filed Aug. 16, 2000, the disclosure of which is incorporated herein by reference.

BACKGROUND OF THE INVENTION

This invention relates in general to editing digital images over a network, and, in particular, over the Internet.

Computer systems can hold digital images that are far larger than they can display. A typical computer display has a resolution of approximately 1,000 rows and 1,000 columns, for a total of about 1,000,000 pixels. The computer's hard drive may store images destined eventually for printing at resolutions of thousands of pixels per inch, and containing hundreds of millions or billions of pixels.

Given the inherent mismatch between the size of an image a computer can store and the size of the image it can display, the process of interactively editing high-resolution digital images on a computer is necessarily one in which the image the user sees is a proxy for the image she is actually editing.

A proxy image is created by downsampling or windowing.

Downsampling comprises supplementing an original image by a new lower-resolution image in which each pixel is a weighted average of (or a sample from) a square of pixels from the original image. A downsampled image is a lower-resolution representation of the same scene shown in the original image.

Windowing comprises selecting a rectangular subset of pixels from a larger rectangular image, with the rectangular window parallel to the orientation of the larger rectangle. The windowed image is at the same resolution as the original image, but shows only a fraction of the scene shown in the original image.

The key to making a fast digital-image editing system is to take advantage of the low resolution of the computer display and of the proxy images displayed on it. The number of pixel transformations produced by the system should be on the order of magnitude of the number of pixels delivered to the computer's display screen, with processing of the high-resolution image deferred until the user chooses to save it.

A digital-image editing system is needed which has the rapid image-transformation speed made possible by operating on low-resolution proxy images, but which still makes it possible for the user at any time to zoom into an window of the archival image or of an intermediate-resolution image in order to view the edited version of the higher-resolution image.

The system preferably permits the user to back out of decisions, and revert to an earlier state of the editing session. I.e., the system should permit the user to undo any sequence of editing operations.

The system preferably permits the user to enter edit instructions and to view proxy images on a client computer remote from the server computer on which archival images reside and on which the pixel-transforming edit operations are carried out. I.e., it should be a networked system, suitable for use on local or wide-area networks, and, in particular, on the Internet, using the protocols of the World Wide Web.

The system desirably does all of the above cost-effectively. In particular, the preferred mode is for the system to remain fast and flexible on computers with limited processing speed or with limited amounts of random access memory (RAM) relative to the image editing task.

SUMMARY OF THE INVENTION

The preferred embodiments of the invention are a system and method using inductive image generation with cached, state-specific image tiles for editing digital images. A computer system contains an archival digital image to be edited and viewed, a transformation state list, describing editing operations to be applied to the archival image in order to produce the current edited-image rendition, and a viewing data set, describing the resolution, offset and extent of the current view of the current edited-image rendition. The current view is constructed from a set of image tiles kept in a tile cache. In response to an instruction to generate the current view, the system identifies the requisite tiles, and then generates each tile by an inductive image generation process. The latter process comprises (a) ascertaining if the tile is already in the cache, and, if not (b) ascertaining if the image is unedited and if so obtaining the requisite tile from the image file, and if not (c) generating the tile by identifying and assembling the requisite supplier tiles in the previous state of the image-editing process and by then applying the current state's editing transformation function to the supplier tiles. The inductive image-generation process is recursive in that in case it is necessary to assemble supplier tiles in the course of the inductive image-generation process then they too are assembled by the process of inductive image generation.

The use of inductive image generation with cached state-specific image tiles lets the system build on earlier work without forcing the system to hoard earlier work: tiles are cached for later use, but the system does not require an exhaustive cache of earlier-constructed tiles; tiles may be purged from the cache as required; once a tile is purged from the cache it is really gone from memory; there is no residual stub or place-holder. The system also constructs image tiles only when they are needed, either directly, as part of a view of an image, or indirectly, in order to construct, by the process of inductive image generation, a tile that is needed directly; there are no stubs or place-holders in system memory for tiles that have not yet been referenced but might be needed in the future. Hence the system is able to produce results rapidly without requiring large amounts of digital memory in order to do so. These capabilities are particularly advantageous in light, first, of the frequent need to undo editing decisions, and in light, second, of the frequency with which zoom operations are applied in editing a master image by means of a proxy image-editing system.

The following is an example of the advantages of the system in light of the need to undo editing operations. Imagine an image-editing session that has gone through 24 transformation states and in which the user wishes to revert to the $16^{th}$ state. Because no single state-specific tile is precious, the system was able to go from state 16 to state 24 without worrying obsessively about conserving earlier work; it may well have purged some state-16 tiles from the tile cache in the process. But the chances are also good that there is a patchwork of various tiles from states 0 through 16 still remaining in the cache. The inductive image generation system is able to build on whatever combination of tiles remains in order to rapidly regenerate the state-16 view.

The following is an example of the advantages of the system in light of the frequency with which zoom operations are applied in editing a master image by means of a proxy image editing system. Imagine again an image-editing session that has gone through 24 transformation states. The user is likely to have zoomed and panned around the image from time to time. Suppose the user normally viewed a $\frac{1}{32}$-resolution overview of the image, but that she zoomed into a particular point of interest in the 1:1 full-resolution version of the image when in state 16 of the editing process. Suppose she is now in state 24, viewing the $\frac{1}{32}$-resolution view, and that she then zooms into the a 1:1 full-resolution view centered on the same point of interest that she viewed in detail in state 16. When, at state 16, the user looked at this area of interest in a full-resolution 1:1 view, the system put the requisite full-resolution state-16 tiles in the tile cache. Some of these tiles may have subsequently been purged. But some may remain. And the system, using inductive image generation is able to build on the remaining 1:1 state-16 tiles to build the requisite 1:1 state-24 tiles without having to regress all the way back to the state-0 1:1 tiles that may be fetched from the image file.

Other features and advantages of the present invention will be understood upon reading and understanding the detailed description of the preferred exemplary embodiments, found hereinbelow in conjunction with reference to the drawings, in which like numerals represent like elements.

BRIEF DESCRIPTION OF THE DRAWINGS

FIG. 3 shows a pixel-tile conversion schema permitting pixel addresses to be transformed into tile addresses and vice versa.

FIG. 6 is pseudo computer code illustrating six of the preferred embodiment's principal functions.

DESCRIPTION OF THE SPECIFIC EMBODIMENTS

The first subsection outlines the operations of the system when running on a single computer. There is then a subsection outlining the system when running in a networked client-server environment. This is followed by two subsections describing in detail the process of inductive image generation with cached, state-specific image tiles. There is then a concluding section.

1. Single-computer System

Figure 1:
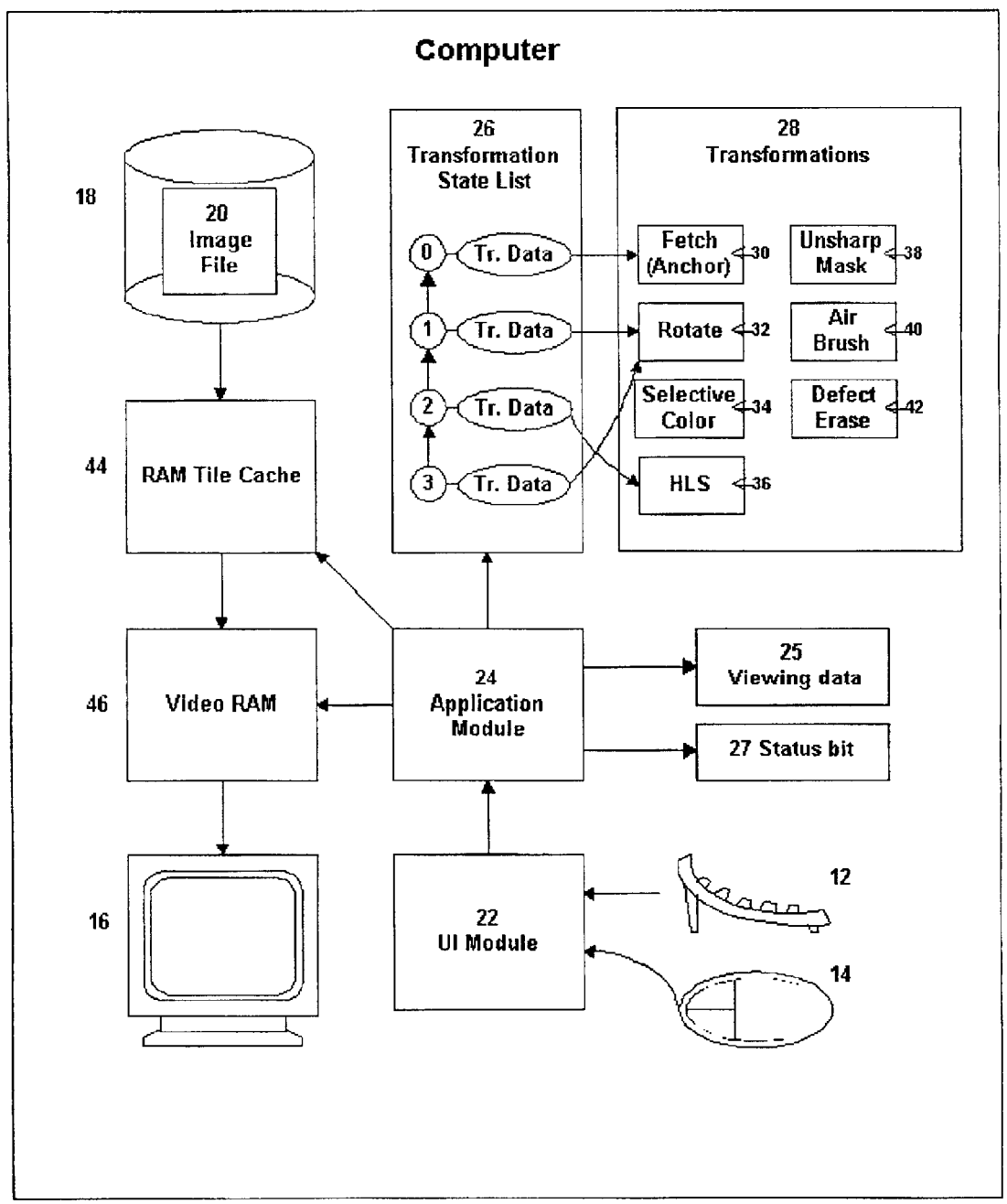
FIG. 1 shows the components of the system in case it is embodied in a single computer.

FIG. 1 illustrates the components of the system of the preferred embodiment in case it is running on a single computer 10.

In a specific embodiment, the system runs on computers with CPUs manufactured by Intel and with operating systems manufactured by Microsoft, but the invention is suited for any general-purpose computer.

A user of the computer uses user-interface devices such as keyboard 12 and mouse 14 to issue instructions to the system, and sees the results of these instructions on video display 16.

The computer contains a hard disk drive or other non-volatile storage device for digital data 18 containing at least one image file 20.

The software of the system is partitioned into a user-interface (UI) module 22 and an application module 24. In a specific embodiment, the software is written in the C++ and Java programming languages, but it could be written in any general-purpose computer-programming language.

The UI module 22 takes in inputs from UI devices such as keyboard 12 and mouse 14 and translates these inputs into file-selection, editing and viewing instructions. The latter instructions are then encoded and communicated to application module 24.

Application module 24 carries out file-selection, viewing and editing operations. It does so with the assistance of viewing database 25, transformation database 26, and transformation functions 28. The contents of viewing database 25 and transformation database 26 change in response to image-editing and viewing instructions received from UI module 22. The set 28 of viewing transformations is fixed and invariant during any single image-editing session.

At any one time, a single image file, such as image file 20, is displayed.

The image in the file is displayed as it appears after a sequence of edit operations, and after a viewing transformation, detailed instructions for which are encoded in viewing data 25 and in transformation state list 26, respectively.

Viewing data 25 include the resolution, the offset and the extent of the current view. Resolution is defined here to be a linear extent, height or width, of the current view as a ratio to the corresponding linear extent of the archival file. So, for example, a view of resolution ½ has half the height and half the width of the archival file. Offset is measured horizontally and vertically, in pixels, from the top left of a full-content image of the given resolution. The pixel indicated by the given offset will be at the top left of the displayed image. Extent is measured horizontally and vertically, in pixels, from the top left of the displayed image.

The resolution of the current view may have resulted either directly or indirectly from the user's viewing decision. Systems will often be constructed so that the initial view is the highest-resolution view which fits within a given computer-screen display window and gives an overview of the full scene in the archival image. There may be additional constraints, such as that downsampled images are available only in even powers of two. Thus a very high-resolution archival image may need to be downsampled to a resolution of, say, $\frac{1}{64}$ in order to fit within the viewing window. A lower-resolution archival image may be downsampled to, say, a resolution of only ¼. Subsequently, the user may issue explicit instructions to zoom in by a factor of two on the displayed image, thus explicitly requesting a $\frac{1}{32}$-resolution image in the first case and a ½-resolution image in the second case.

Transformation data are encoded in transformation state list 26. The state list is a sequentially-numbered list of transformations to be applied to the archival file, with the numerical sequence anchored at number 0. Each state in the sequence is characterized by a pointer to a set of transformation functions and by a set of transformation data further characterizing the transformation functions. For example, the particular example illustrated at 28 in FIG. 1 is one in which seven families of transformations can be applied to the image. These are:

The anchor transformation 30, Fetch image data from the file;

32, Rotate the image;

34, apply a Selective Color operation to the image;

36, apply an HLS (Hue, Lightness, Saturation) color operation to the image;

38, apply an Unsharp Mask operation to the image;

40, apply an Airbrush operation to the image;

42, Erase a Defect in the image.

The edited image is constructed by applying a sequence of such transformations to a file image.

The first transformation applied, at anchor state 0, is always to fetch the image from the file, operation 30.

Subsequent operations can be any ones of the remaining transformations, in any order. Operations can be applied more than once. The exact manner of their application is indicated by the transformation data stored in association with each node in the state list. For example, following the anchor image-fetching operation at state 0 of FIG. 1, the subsequent three operations are:

1, Rotate;

2, HLS;

3, Rotate (again).

In this example, the transformation data associated with the three states might be:

1, Rotate 30 degrees clockwise;

2, Lightness increase by 20 percent;

3, Rotate 11 degrees counterclockwise.

The transformation data associated with anchor state 0 identifies the image file and describes characteristics of it and of the methods to be used for fetching data from it; some image files contain only the full-resolution image; other image files supplement the full-resolution image, in the same file or in linked files, with precomputed downsampled versions of it. In the former case, any downsampled image requested at state 0 has to be constructed from the archival full-resolution file image. In the latter case, downsampled images of some resolutions are obtainable directly from the file; downsampled images of other resolutions can be constructed from file images closer in resolution to the target image than is the fullresolution image.

Viewing dataset 25 and transformation state list 26 together contain all the information needed by application module 24 to construct the currently-requested image view. Status bit 27 indicates whether or not a view with the characteristics encoded by viewing and transformation datasets 25 and 26 has been constructed. When application module 24 receives new transformation or viewing instructions from UI module 22, it updates the viewing and transformation databases 25 and 26 to conform to the just-received instructions and then resets status bit 27 to value 0 in order to indicate that the view currently displayed on screen 16 is now inconsistent with the instructions in databases 25 and 26. Application module 24 then constructs the requisite view, as specified by the two databases, and then, finally sets the status bit, thus indicating that the view now constructed is the one specified in the databases.

A view is constructed by building or assembling a set of image tiles, placing them in a tile cache, and locking them down there until they have been copied into the system's video RAM 46. Image tiles are specific to each state; a transformation is carried out by building a new set of image tiles for the transformed state, each tile carrying the identity of its state. These new tiles are then added to the tile cache 44 in which they then supplement earlier image tiles for earlier states. However, the cache is of limited size. Hence it is occasionally necessary to purge old tiles, not locked down for the current view, from it. Thus some tiles that have been created in the history of an editing session may be missing from the cache.

The preferred embodiment requires an image-tiling schema sufficiently well defined so that given the identifier of a tile the identifiers of all pixels contained in it can be computed, and so that given the identifier of a pixel the identifier of the containing tile can be computed. A particularly simple example of such a scheme, used in the specific embodiment described here, is one in which all image tiles are rectangles or squares of the same dimensions, such as 128 columns and 128 rows, and in which image tiling obeys the following full set of rules:

(1) all tiles are of dimension n by n;

(2) the origin of each image is at the upper left;

(3) the coordinates of the pixel at the origin are (x=0, y=0);

(3) pixels are identified by their column, x, measured as a 0-anchored count to the right of the origin pixel, and by their row, y, measured as a 0-anchored count down from the origin pixel;

(4) the image is partitioned into a square grid of tiles in such a manner that the pixel at the top left of the tile at the top left is the origin pixel;

(5) tiles are identified by their column, x, measured as a 0-anchored count to the right of the origin tile, and by their row, y, measured as a 0-anchored count down from the origin tile;

(6) n=128.

This particular image-tiling scheme of (1)–(5) above is illustrated, for the case n=4, in FIG. 3.

Given these particular rules, it follows that if the width of the image is not an even multiple of the standard width of a tile, then tiles at the far right of the image will have less than standard width. Similarly, tiles at the bottom of the image may have less than standard height. These effects can be seen in FIG. 3. Rule (1) above, specifying identical dimensions for all tiles, can be amended to reflect these exceptions, or the tiles at the right and bottom of the image may be always padded out to the standard dimension with transparent pixels. It makes little difference which approach is chosen.

Given rules (1) through (6) above and the specification of an image, a tile is uniquely identified by its row and column pair, (x, y). But the tile cache in the preferred embodiment intermingles tiles from different images, differing from the archival file image in their resolution and edit state. Hence it requires four numbers to specify the image-portion contained within an image tile:

(1) the state of the image tile;

(2) the scale of the image;

(3) the column (x value) of the image tile;

(4) the row (y value) of the image tile.

For example, suppose we are given the state list 28 of FIG. 1, with specific transformations as described above:

1, Rotate 30 degrees clockwise;

2, Lightness increase by 20 percent;

3, Rotate 11 degrees counterclockwise.

Then the tile (state=0, scale=½, x=0, y=0) is the top left tile from a ½ resolution view of the image as it originally was, with no transformations applied to it. And the tile (state=3, scale=¼, x=0, y=0) is the top left tile in a ¼ resolution view of the image as it appears after the three transformations (rotate+30 degrees, lighten 20 percent, rotate −11 degrees) listed above.

Image generation is done inductively in the preferred embodiment in order to take advantage of the fact that the tile cache 44 may already contain a set of supplier tiles from states that are close predecessors of the current state s. The application module 24 computes from its viewing data 25 the identifying characteristics (state, scale, x, y) of the set of tiles it needs to assemble in order to generate the current view. For each required tile, the application looks in tile cache 44 to see if the tile is present there. If so, it locks the tile in place, to prevent it from being purged until the view is complete. If not, it computes the set of supplier tiles required from the antecedent state s-1 (with the same given scale) in order to build the currently-needed tile. It looks for these supplier tiles in the tile cache 44, and if they are present, applies the state-s transformation to them in order to generate the required tile. If the supplier tiles are not present, the preferred embodiment recurs backward, looking for the suppliers of the suppliers, in order to build them, and so forth. This recursive process is guaranteed to terminate, since the eventual supplier set of any tile can always be found, in the worst case, at state 0 in the file itself.

Eventually, using the process of inductive image generation, the application module 24 succeeds in assembling, in tile cache 44, all the tiles needed for the current view. These tiles are then all present in the cache, and locked against any tile-purge attempt. The application module then copies these tiles, with the appropriate offsets so they fill up the image grid, into video RAM 46, whereupon they become immediately visible on computer display 16. Finally, the application module then unlocks the just-copied cached tiles, so that the digital memory they consume in the tile cache is recoverable if needed for new tiles later.

This completes the overview of the system when running on a single computer. The subsequent subsection outlines the system when running on a server computer and a client computer, connected by a network.

2. Client-server System

Figure 2:
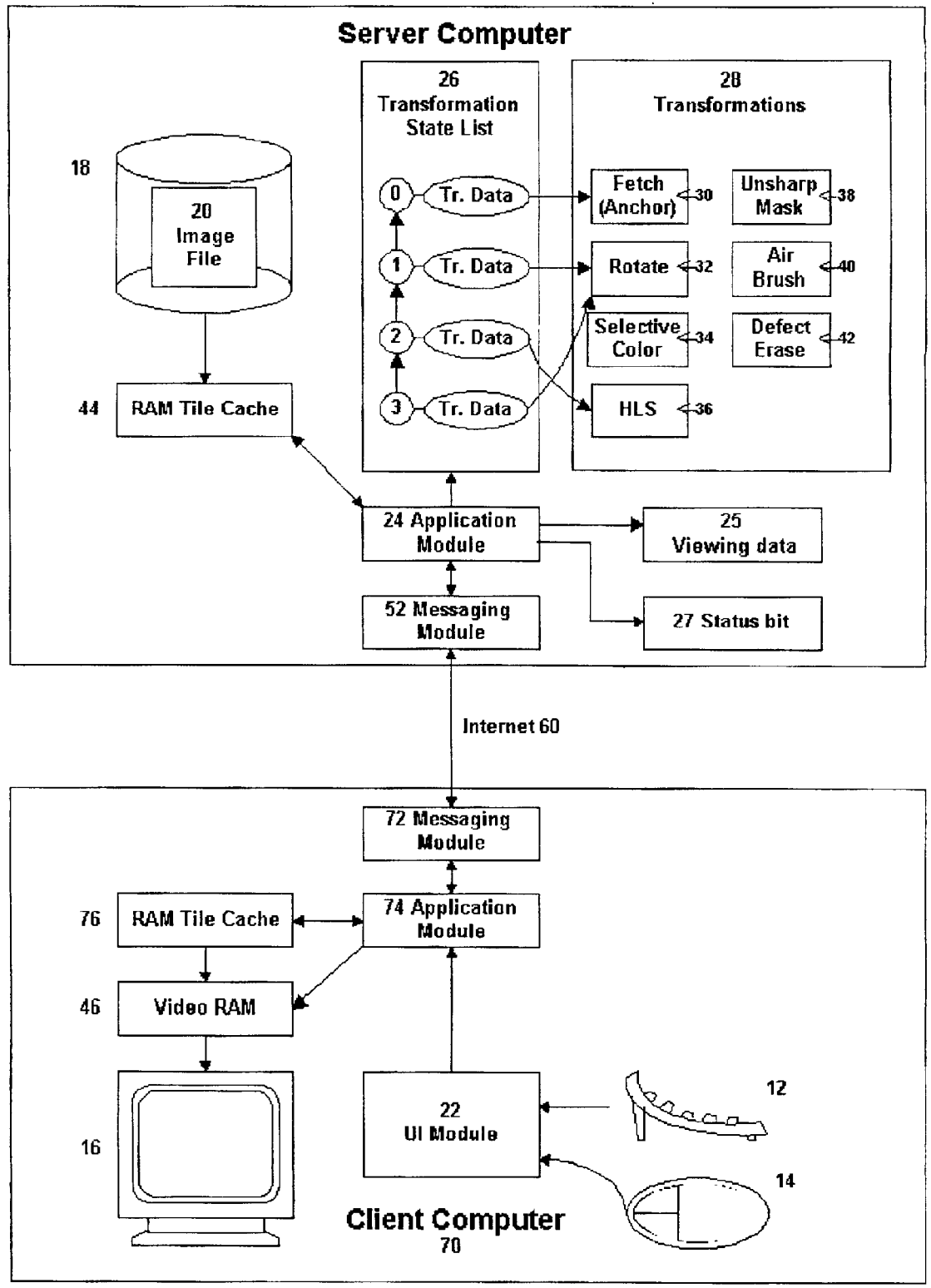
FIG. 2 shows the components of the system in case the main image editing functionality is running on a server computer and the user interface functionality is running on a client computer, with the two computers connected by a network such as the Internet.

FIG. 2 shows how the system can be partitioned between a server computer 50 and a client computer 70, communicating over a network such as the Internet 60. The server then retains the basic image-editing computational tasks of the system, and the client handles the user-interface and display tasks.

In FIG. 2, server computer 50 has retained from the single computer system 10 the hard disk drive 18, including archival image file 20, the RAM tile cache 44, the transformation state list 26, the set of transformations 28, the viewing data 25, the status bit 27, and the application module 24. Server computer 50 has acquired a messaging module 52, capable of transferring and receiving messages over Internet 60 encoded into the Internet transmission protocol language TCP/IP and perhaps also encoded into the World Wide Web's messaging protocol HTTP.

The server's messaging module 52 receives from the client computer 70 editing, undo and viewing instructions. An editing instruction is an instruction to advance the editing state 26 to a new state characterized by a specific editing operation 28 and associated editing-parameter data transmitted by the client. An undo instruction is an instruction to revert the state to an earlier state in state list 26. A viewing instruction is an instruction to change the scale, offset, or extent specified in viewing data set 25. The resulting requisite image tiles are then the tiles that will render the image edited according to the instructions in state list 26 and viewed according to the viewing parameters encoded in viewing data store 25.

The client computer 70 in the client-server system acquires the keyboard 12, mouse 22, and user-interface software module 22 of the single-computer system 10. It also has the single-computer system's video display 16 and video RAM 46. Client computer 70 also has its own messaging module 72, its own tile cache 76, and its own application module 74. The client's application module 74 handles some of the functions, particularly the copying of tiles from client tile cache 45 into video RAM 16, that were handled by the integrated system 10's application module 24.

The path a tile travels on its way to being displayed is now as follows. The server computer's application module 24 uses the process of inductive image generation, using the RAM tile cache 44, viewing data 25 and the transformation state list 26 and transformations 28 to assemble in tile cache 44 the requisite set of tiles for the current image view. The tiles are then passed by server application module 24 to server messaging module 52 where they are encoded into the appropriate packets and sent across Internet 60 to the client computer's messaging module 72, whereupon the client computer's edit module 74 decodes them and places them in the client computer's own tile cache 76. The client computer's own edit module then copies the newly-received tiles from the tile cache 76 into video RAM 46, whereupon they become immediately visible on video display 16.

The tile cache of client computer 70 must be big enough to hold at least one tile. It is advantageous to make it much bigger than this. Client systems can be designed with minimal, moderate or extreme sophistication about tile caching. In the former case, the client system copies each tile from its cache 76 into video RAM 46 on receipt, and purges each tile from the cache after it has been copied to video RAM. In the latter case, the client system 70 retains the state and scale information of all tiles in its own tile cache, retains awareness of the current state of the system, and retains a copy of viewing database 25, so it has the same awareness of the properties of the current view as does server system 50. In this case the client system has a caching system fully comparable to that of the server; the client, in response to a user-initiated view change or undo operation, can look in its own cache for the required tiles before requesting them from the server.

3. Inductive Image Generation: Description

The following is an outline of the three functional components that are key to the inductive image generation process. This outline is followed by a more-detailed description of the inductive image-generation process.

In the preferred embodiment, there is a function, called FindGeneratingRegion in this document, which, given the generating transformation associated with a state, is capable of answering the following question for any tile in any view of the image:

Q1: What is the generating region for the tile? I.e., what region of the prior-state image at this resolution is such that application of this state's transformation operation to it will generate the requisite tile?

There is also a function, called FindTilesIntersecting here, which is capable of answering the following question for any region in any view:

Q2: What are the tiles that intersect the region?

Finally, there is a function, called BuildTile here, which, given the existence of all state s-1 supplier tiles required to build a given state s tile under the transformation associated with state s, is capable of applying the transformation to the state s-1 tiles in order to build the state-s tile.

It follows that by starting with a tile of a given state, answering Q1 for it, thus obtaining its generating region, then passing the identity of this region back to the prior state and answering Q2 for it, the system can identify the set of tiles of the prior state minimally necessary to generate the currently-needed tile. The system, having identified these prerequisite tiles, may or may not find them in its tile cache, but, because of the constructibility of all state-0 tiles from the image file, the system is guaranteed that by iterating this process it will, eventually, find a set of tiles, cached or in the image file, to which it can apply function BuildTile to eventually build the required tile in the current state.

The following is a more detailed description of the inductive image generation process.

FIGS. 4 through 8 illustrate the inductive image generation process, as carried out by the application module 24 of the preferred embodiment.

Figure 4:
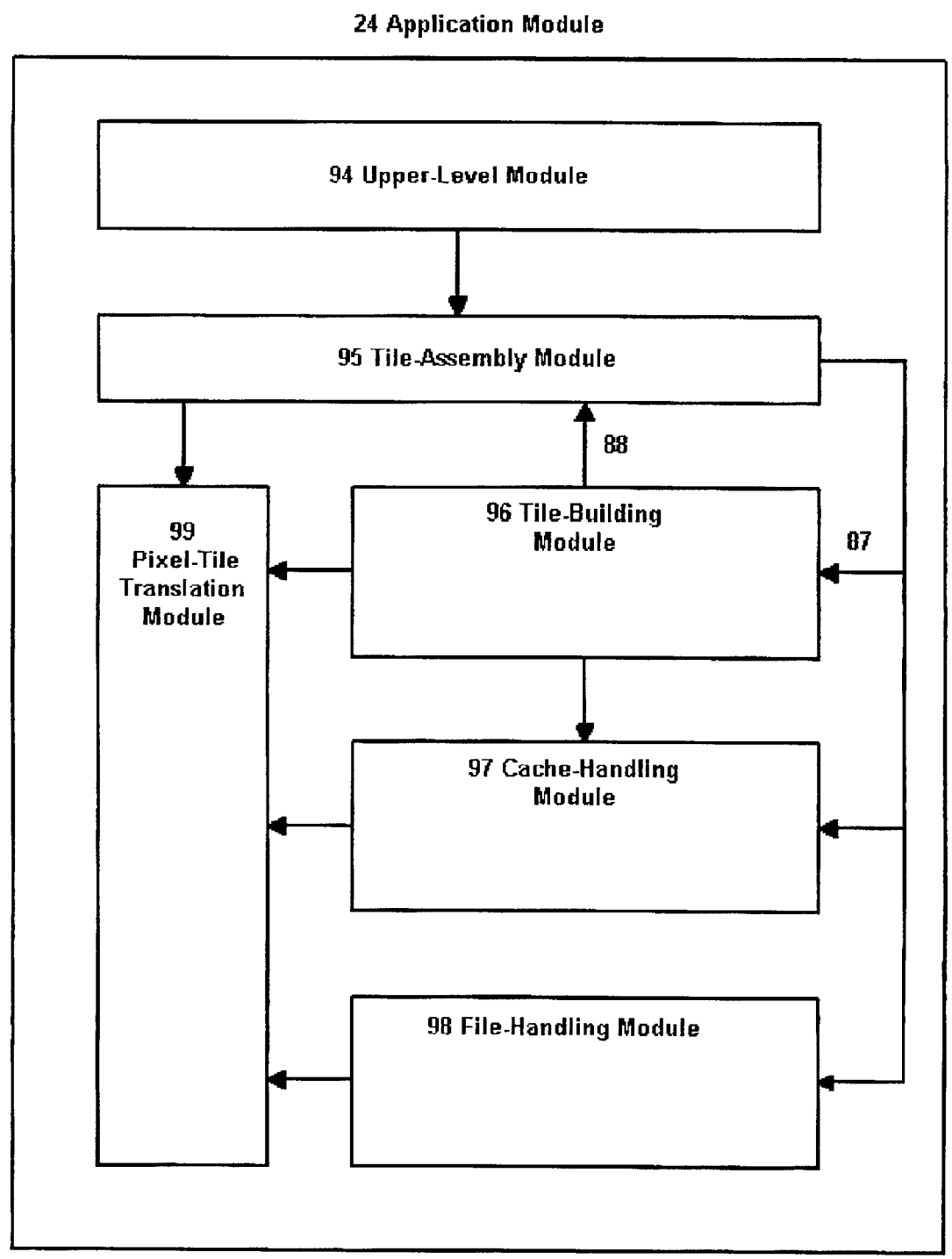
FIG. 4 shows some of the principal submodules of the preferred embodiment's application module.

FIG. 4 illustrates six modules within the application module 24. Shown in FIG. 4 is the upper-level module 94 and five modules used in the tile-assembly process to assemble the set of image tiles conforming to the current viewing instructions 25 and the current state list 26.

The tile-assembly process begins when a procedure in the upper-level module 94 calls a procedure in the tile-assembly module 95. The latter procedure then calls into one of three specific tile-acquisition modules: tile-building module 96 constructs a tile in state s by applying the state-s image transformation to tiles in state s-1; cache-handling module 97 extracts a tile from tile cache 44; file-handling module 98 extracts a state-0 tile from the image file.

With one important exception, control flows in a single direction, from the tile-assembly module 95 to the specific tile-acquisition modules 96, 97 and 98. The exception is for the flow of control between tile-assembly module 95 and tile-building module 96. Suppose that the only way to get a given tile in a given state is to build it from tiles in the prior state. In that case, control flows from the tile-assembly module 95 to the tile-building module 96 as shown by arrow 87. But the requisite tiles from the prior state also need to be assembled. Hence control will flow back into the tile-assembly module 95, as shown by arrow 88, in order to assemble the prior-state tiles.

All four tile-acquisition modules 95, 96, 97 and 98 have access to a pixel-to-tile (and vice-versa) translation module 99. The incorporation within the preferred embodiment of a well-defined pixel-tile conversion schema, as in FIG. 3, means that tiles can be requested either directly, by their (state, scale, tile-x, tile-y) addresses, or indirectly, by the (state, scale, pixel-x, pixel-y) addresses of pixels they enclose. The preferred embodiment makes use of the dual-modality of the addressability of tiles. For example, the specific embodiment described here is capable of fetching tiles explicitly, by specification of their own addresses or implicitly, by specification of a region of image pixels. Function GetTile, shown at 109 in FIGS. 5, 6 and 7 fetches a tile specified by its explicit address. Function GetTiles, shown at 101 in FIGS. 6 and 7, fetches all tiles that intersect a specified region, with the latter specified by the pixel addresses of its boundary.

Figure 5:
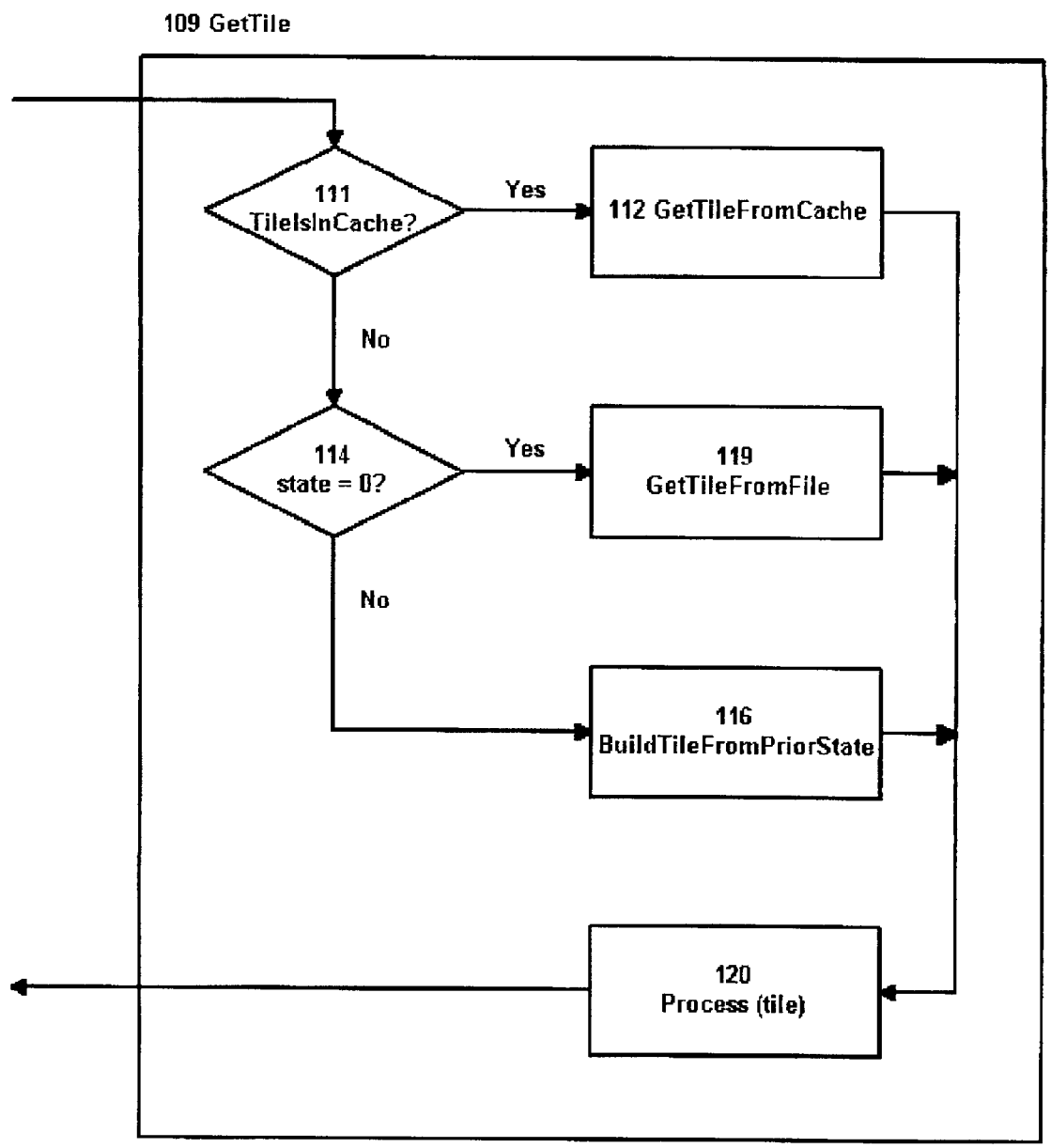
FIG. 5 is a flow chart showing the flow of control of operations within the preferred embodiment's GetTile function.
Figure 7:
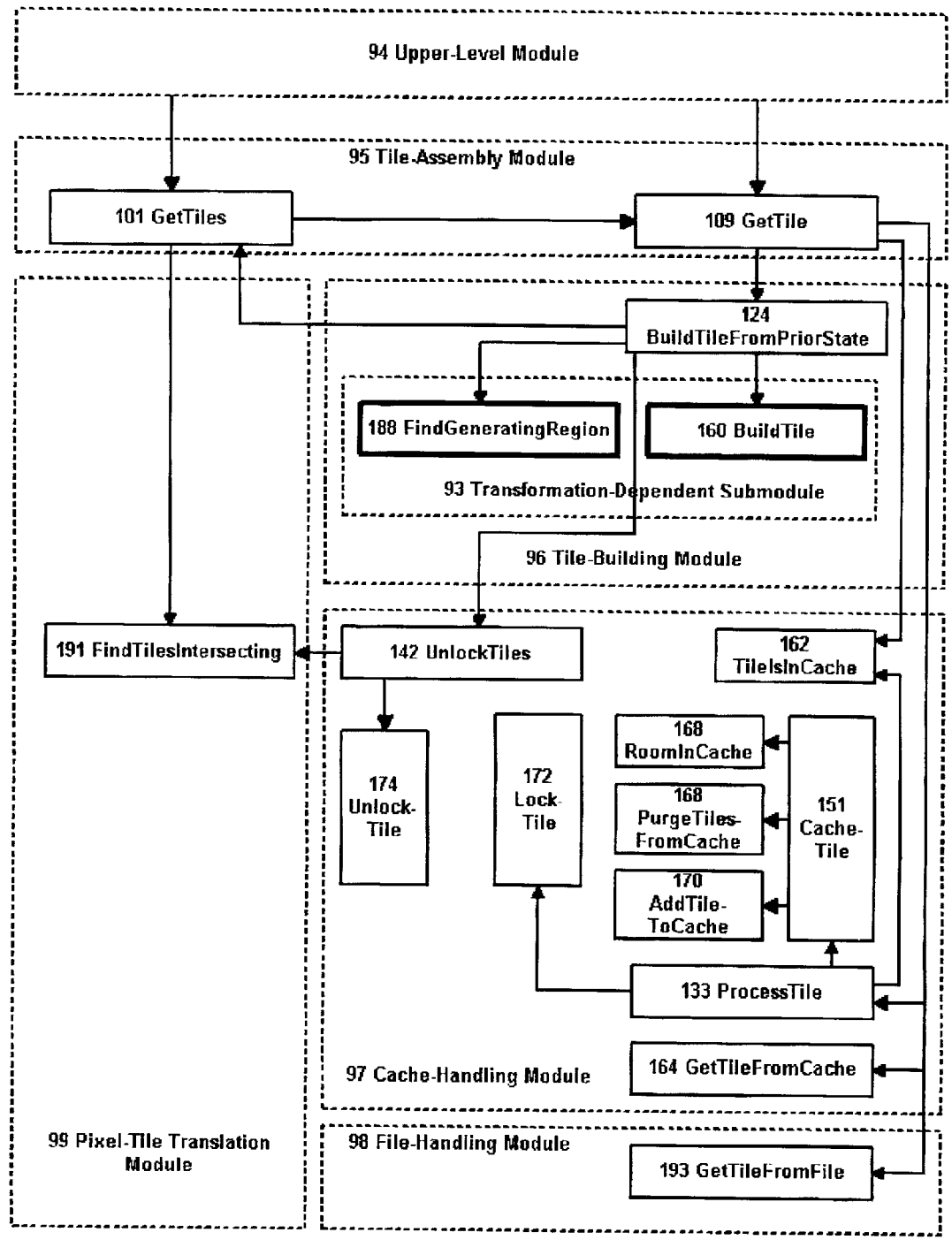
FIG. 7 shows the calling structure of the functions shown in FIG. 6, and also shows the locations of the functions within the modules of FIG. 4.

FIGS. 5, 6 and 7 show details of the operations within the tile-acquisition modules of FIG. 4.

FIG. 5 shows the flow-of-control for the explicit-address tile-acquisition function, GetTile. This and other functions of the preferred embodiment have been given explicit names in order to permit their relationships to be shown in FIG. 6 by pseudo computer code. The flow-of-control of one function, GetTile, is illustrated by both a flow chart, FIG. 5, and by pseudo code, FIG. 6b. Details of the operations of other functions are shown by the more-compact pseudo code notation only. The pseudo code illustrates the flow of control. The preferred embodiment may be embodied in computers that achieve the same flow of control by running computer code in which functions have other names and other organizations than in FIG. 6. In particular, the functions and structures of the computer code can be organized into objects as is done in object-oriented computer languages such as C++, or programming tasks can be organized into threads as is possible on multi-threaded computer operating systems. In these cases, the functional organization differs from the functional organization shown in the pseudo code of FIG. 6, but the flow of control implied by the functional organization remains the same as the flow of control implied by FIG. 6.

FIG. 6 includes pseudo code for six functions. The identifying numbers used henceforth for these functions are the line numbers of their first lines in FIG. 6. These six functions reference other functions for which no pseudo code is shown here. These functions are assigned identifying numbers that do not correspond to line numbers in FIG. 6.

FIG. 7 shows the dependency relationships among the functions illustrated by pseudo code in FIG. 6, and shows the location of these functions within the tile-acquisition modules of FIG. 4. (FIG. 7 does not show the order in which functions are called, but only their dependency hierarchy; i.e., what calls what.).

In the remaining description of a specific embodiment a tile address or tile ID is the identifying quadruplet (state, scale, x, y). A "tile" is a structure including the appropriate pixel bitmap or "tile raster," in addition to a header containing the tile ID quadruplet (state, scale, x, y). A consequence of these conventions is that exchanging a tile address for the corresponding tile does not entail loss of the address.

The following description of the GetTile process can be followed with reference to either the flowchart FIG. 5 or the pseudo code FIG. 6b.

Function GetTile 109 is passed a tile address. It first ascertains, at 111, whether the tile with the given address is in tile cache 44. If so, it gets the tile from the cache at 112 via a call to function GetTileFromCache 164. If the tile is not in the cache, function GetTile ascertains, at 114, whether the edit process is in the anchor state 0. If so, it gets the tile from the image file at 119 via a call to function GetTileFromFile 193. If the edit process is not in anchor state 0, the requisite tile has to be built from prior-state supplier tiles, and GetTile builds the tile from the prior state at 116 via a call to function BuildTileFromPriorState 124.

Having obtained the tile, function GetTile calls, at 120, function "Process" 133 which adds the tile to the cache (if it is not already there) by a call 136 to CacheTile 151, and then locks the tile in the cache by a call 137 to LockTile 172 so that it cannot be purged by subsequent calls to CacheTile.

Function GetTile 109 gets a tile specified by its explicit tile address. Function GetTiles 101, in contrast, gets all the tiles that intersect a region specified by pixel addresses. The incorporation within the preferred embodiment of a well-defined pixel-tile conversion schema, as in FIG. 3, means that the preferred embodiment is able to carry out procedures such as FindAllTilesIntersecting 191 which is passed a region identified by pixel addresses (and also a state and a scale), and which then returns the list of all (state, scale, x, y) tile addresses of all tiles that intersect the region.

Procedure GetTiles 101 calls FindAllTilesIntersecting at 102 and then calls GetTile at 105 for every tile address in the list. Every tile obtained by GetTile 109 is then locked into the cache via a call at 120 to Process 133, so all tiles obtained by GetTiles end up locked into the tile cache.

As is illustrated in FIG. 7, functions GetTiles and GetTile are the two entry points into the tile-acquisition modules. These two entry points are called by functions in the upper-level module 94 of the application module 24. Hence, as can be seen with reference FIGS. 1 and 2, an image request coming into the application module 24 from UI module 22 can specify the required image portion either as an explicit tile (in which case GetTile is called) or as a (perhaps rectangular) image region specified by its bounding pixel vertices (in which case GetTiles is called). Hence, in the case of the client-server application of FIG. 2, the client's application module 74 may either have the ability or lack the ability to compute the explicit tile addresses of tiles corresponding to an image region. If it lacks this ability, it must request image tiles indirectly, by asking for a region of pixels. If it has this ability, it can request tiles directly.

The core of the preferred embodiment is invoked when procedure GetTile finds, at step 116, that it needs to build the required tile from tiles in the prior state via a call to BuildTilesFromPriorState 124. The ensuing process is illustrated in FIG. 6*c* and in FIG. 8.

FIG. 8*a* illustrates a 25-tile state-s-1 image 200 that then undergoes a 30-degree clockwise rotation that transforms it into the 49-tile state-s image 210 of FIG. 8*b*. Because all images in the specific embodiment must be horizontal rectangles, the rotated state-s image is bigger than the state-s-1 image. The rotated image is padded out with empty tiles such as (x=0, y=0) in order to keep the rectangle of the image horizontal.

Suppose there is a call to GetTile (s, scale, x=4, y=2), requesting tile 220 of FIG. 8*b*. (The value of "scale" is irrelevant here, so long as it is the same in both image 200 and 210.) Suppose further that function GetTile could not find tile (s, scale, x=4, y=2) in the tile cache, so that it called at 116 procedure BuildTileFromPriorState 124, passing it the tile address (s, scale, x=4, y=2).

Figure 8:
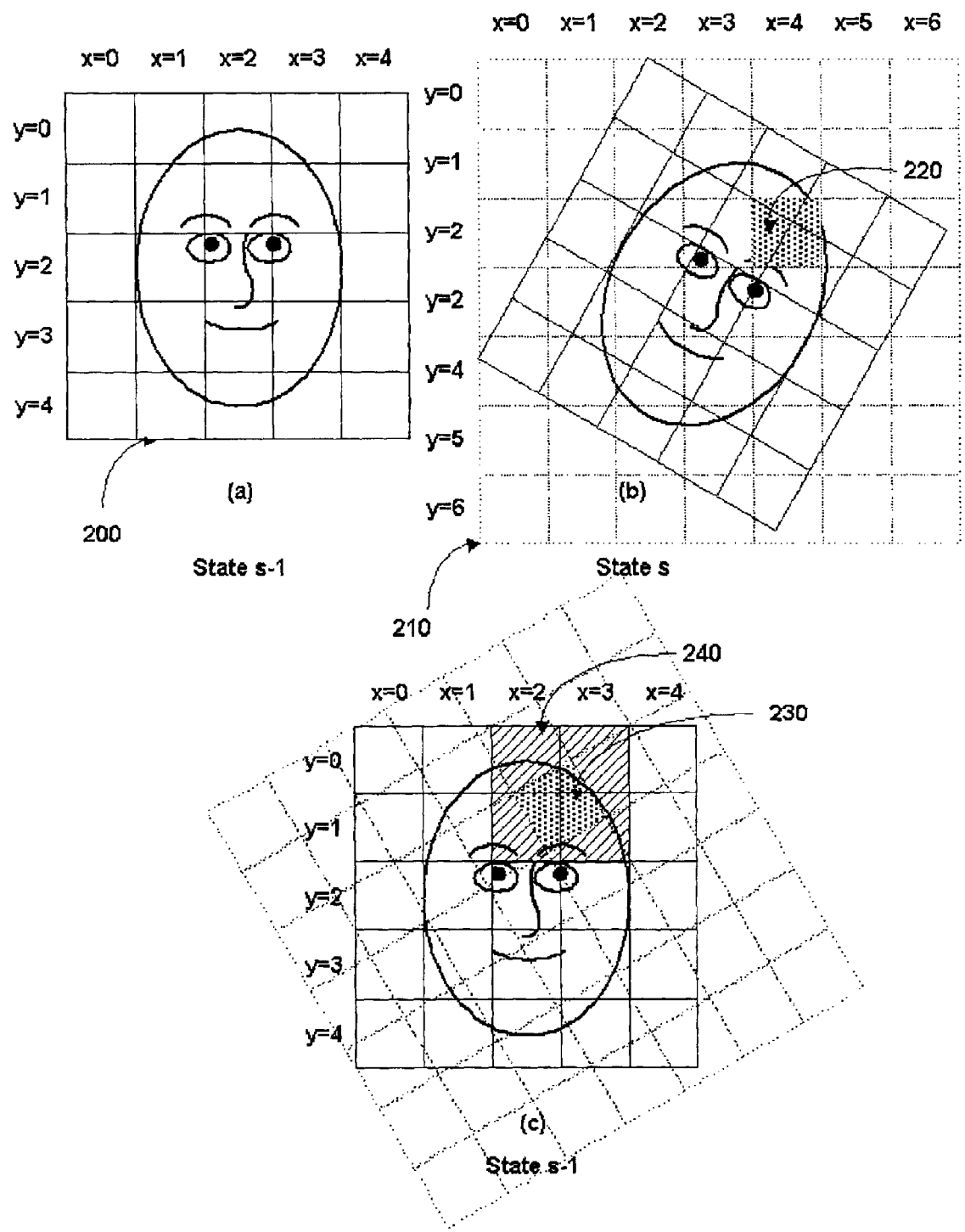
FIG. 8 illustrates inductive image generation under the example of an image rotation.

The first thing BuildTileFromPriorState does at 126 is to pass the tile address (s, scale, x=4, y=2) to function 188, FindGeneratingRegion. The job of the latter function is to compute the pixel-coordinate vertices of the region in the prior state from which the current tile is generated. In FIG. 8, tile 220 comprises a portion of the forehead of the rotated face. By reversing the rotation, as in FIG. 8*c*, procedure FindGeneratingRegion derives the diamond-shaped area 230 in state s-1 that is the source, under the rotation transformation leading to state s, of the area 220. At step 126 the pixel-coordinate vertices of area 230 are returned to BuildTileFromPriorState as "region."

At step 127 of BuildTileFromPriorState, the just-computed region is passed, along with the identifier of the prior state, state s-1, and the scale, to the already-described tile-assembly procedure GetTiles 101. Procedure GetTiles then concludes, by a call at 103 to FindTilesIntersecting 191 that the four tiles indicated by hatching in FIG. 8*c*, comprising collectively region 240, are the state-s-1 tiles that intersect region 230.

These are the requisite state-s-1 supplier tiles for generation of the state-s tile 220. Procedure GetTiles then, at 105, calls procedure GetTile again for each of these state-s-1 tiles.

Procedure GetTile is guaranteed to succeed in constructing each of the four requisite state-s-1 tiles in region 240 of FIG. 8*c*. How it does so depends on the detailed characteristics of the state list 26 and of the tile cache 44 at the time GetTile is called. GetTile may find a state-s-1 tile in the cache. It may have to call BuildTileFromPriorState again to build a state-s-1 tile from state-s-2 tiles. It may have to go all the way back to state 0 and get supplier tiles from the file. It may do some combination of the above. What is known, from the way the functions are constructed, is that GetTile will get each of the four tiles in region 240, and that it will place each one, locked, in the tile cache. The result is that when, at 106, procedure GetTiles returns back to calling procedure BuildTilefromPriorState at 128 all four requisite state s-1 supplier tiles 240 will be locked down in the tile cache.

At line 128, finally, procedure BuildTileFromPriorState calls procedure BuildTile in order to build the (state=s, scale, x=4, y=2) tile 220 from supplier tiles 240.

Because of the prior calls at 126 and 127 to FindGeneratingRegion and GetTiles, the supplier tiles 240 required for the call 128 to BuildTile 160 are now guaranteed to be in the tile cache.

Function BuildTileFromPriorState obtains at 128, on return from BuildTile 160, the sought-after state-s tile 220.

Then, at line 129, procedure BuildTileFromPriorState calls procedure UnlockTiles 142 in order to unlock (make available for possible future purging from the tile cache) the four state-s-1 tiles 240 that were used to generate the just-constructed state s tile 220.

Then, at 130, procedure BuildTileFromPriorState returns back to calling procedure GetTile at line 116, returning the just-generated tile.

Then, at 120, GetTile passes the tile to procedure "Process" 134. The latter function looks, at 135, to see if the tile is already in the tile cache. In the case of this example tile 220 is not already in the tile cache, so procedure Process passes tile 220 at 136 to procedure CacheTile 151. Procedure CacheTile checks at 153 to see if there is room in the cache to store tile 220. If not, CacheTile calls at 154 to PurgeTilesFromCache 168 which removes some unlocked tiles from the cache using criteria which may vary depending on the embodiment. Finally, at 155, there is known to be sufficient room in the cache for tile 220, and tile 220 is cached via a call to AddTileToCache 170.

Then, at 156, procedure CacheTile returns back to procedure Process at 137, whereupon the newly-constructed tile 220 is locked in the cache. It will remain locked until it has been delivered to the video RAM 46, in the case of the single computer application of FIG. 1, or to the client computer's tile cache 45, in the case of the client-server system of FIG. 2.

4. Inductive Image Generation: System Extensibility

In FIGS. 1 and 2, the list 28 of available image transformations contains seven transformations. It is a characteristic of the preferred embodiment that it is very easy for an engineer maintaining an embodiment of this invention to extend the system by adding an eighth transformation to the list.

Six functions were illustrated by pseudo code in FIG. 6, and these functions called 11 more functions. All 17 functions are shown in FIG. 7. Of these 17 functions only two BuildTile 160, and
FindGeneratingRegion 188 depend on the set 28 of image transformations. Only these two functions need to be rewritten when a transformation in set 28 is edited or added. Other functions of the system depend on the image state, but only as a means of identifying image tiles; hence these other functions do not change when an existing image transformation is modified or when a new image transformation is added. This special status of the two functions BuildTile 160 and FindGeneratingRegion 188 has been indicated in FIG. 7 by drawing their enclosing boxes in bold and by enclosing them in a transformation-dependent submodule 93 of tile-building module 96.

In many cases, in fact, the addition of a new transformation function to the set 28 will require modifying only one function, BuildTile 160.

Many image transformations share the same procedure for finding the prior-state generating region of a given tile. In particular, there are many "stationary" transformations with the property that pixel (x, y) in state s is constructed from the pixel at the same location, (x, y), in the prior state s-1. For example, all the standard image tone and color change transformations such as contrast and brightness transformations, are stationary transformations. For all such stationary transformations, the generating region of any tile with address (x, y) is exactly the rectangular pixel region it occupies, and the set of supplier tiles for the tile is exactly the tile with the identical (x, y) address in the prior state. Hence a new stationary transformation can be added to the set of transformations with minimal changes to the FindIntersectingRegion procedure.

In fact, it is advantageous to organize the flow of control so that in case a transformation is stationary the control logic in procedure BuildTilesFromPriorState 124 substitutes a single call to a procedure GetSameXyTileFromPriorState for the pair of calls at 126 and 127 to FindGeneratingRegion 188 and GetTiles 101. If the flow of control is organized in this manner, it is only necessary to modify a single procedure, BuildTile, when adding a new stationary transformation.

5. Conclusions

In conclusion, the preferred embodiments provide a system and method of editing digital images that are fast and flexible, permitting full undo and zoom and pan capabilities, on computer systems of limited memory, and which is suitable for operation on a networked computer system, in which the principal computational tasks for image-editing are performed by a server computer, and in which the user interface and image display are handled by a networked client computer. Systems embodying the invention are able to provide these features because of the inductive image generation technology, using cached state-specific image tiles. While the above is a complete description of the specific embodiments of the invention, various alternatives, modifications, and equivalents may be used. In particular, the word "tile" has been used in the discussion of specific embodiments to mean a horizontal rectangle of the image, but the invention may be embodied in systems in which the tiles are not horizontally oriented or are not rectangles. In addition, the word "tile" has been used in the discussion of specific embodiments to mean one of a plurality of identically shaped image portions, but the invention may be embodied in systems in which the tiles are not identically shaped. In addition, the word "tile" has been used in the discussion of specific embodiments to mean one of a set of image portions covering an image exhaustively and also minimally, without overlap, but the invention may be embodied in systems in which some of the tiles do overlap, so that they do not cover the image minimally. Therefore, the above description should not be taken as limiting the scope of the invention which is defined by the appended claims, and in which the word "tile" is intended to mean "an image portion".

What is claimed is:

1. A method for interactively viewing and editing a digital image on a computer system comprising the steps of:

storing an archival digital image in the computer system;

maintaining in the computer system a state list, characterizing a sequence of image-editing operations to be applied to the archival digital image in order to generate a current edited rendition of the digital image;

maintaining in the computer system a set of viewing data, chracterizing the resolution, offset and extent at which to view the current edited rendition of the archival digital image;

maintaining in the computer system a cache of image tiles comprising portions of views of edited renditions of the archival digital image, wherein each image tile is associated with a state in the list; and thereafter updating, in response to image-viewing and image-editing instructions, the viewing data and the state list accordingly, and assembling in the image tile cache in response to image-viewing and image-editing instructions, a set of image tiles sufficient to generate the current view of the current edited rendition of the archival digital image, wherein assembling comprises using the stare list to compute a current tile based on an image tile associated with a previous state.

2. The method of claim 1 wherein said step of assembling includes a step for each tile in the set of image tiles, comprises a) locking the tile in the tile cache when it is ascertained that the tile is in the tile cache;

b) generating the tile from the archival digital image, copying the generated tile into the tile cache, and locking the copied tile in the tile cache when it is ascertained that a current image state is an initial unedited state; and c1) ascertaining, when the tile is not in the tile cache or when the current image state is not in the initial unedited state, a set of supplier tiles in a prior stare sufficient so that the tile can be generated from the set of supplier tiles by application of the image viewing and image-editing instructions, and c2) assembling the second set of supplier tiles, and c3) applying the image-viewing and image-editing instructions to the set of supplier tiles so as to generate the tile and copying the generated tile into the tile cache, and locking the copied tile in the tile cache.

3. The method of claim 2 wherein the supplier tiles in the prior state are assembled, for each tile in the set of supplier tiles, by:

a) locking the tile in the tile cache when it is ascertained that the tile is in the tile cache;

b) generating the tile from the archival digital image, copying the generated tile into the tile cache, and locking the copied tile in the tile cache when it is ascertained that a current image state is an initial unedited state; and c1) ascertaining, when the tile is not in the tile cache or when the current image state is not in the initial unedited stage, a second set of supplier tiles in a prior stare sufficient so that the tile can be generated from the second set of supplier tiles by application of the image-viewing and image-editing instructions of the prior state, and c2) assembling the second set of supplier tiles, and c3) applying the image-viewing and image-editing instructions of the prior state to the second set of supplier tiles so as to generate the tile and copying the generated tile into the tile cache, and locking the copied tile in the tile cache.

4. The method of claim 2 wherein assembling the set of supplier tiles of a tile in the set of image tiles comprises:
   a) ascertaining the region in the prior state from which the tile in the set of image tiles is generated, and
   b) ascertaining the set of prior-state tiles intersecting the region, and
   c) assembling all the supplier tiles in the set.

5. The method of claim 4 wherein assembling the set of supplier tiles of a tile in the set of supplier tiles comprises:
   a) ascertaining the region in the prior state from which the tile in the set of supplier tiles is generated, and
   b) ascertaining the set of prior-state tiles intersecting the region, and
   c) assembling all the supplier tiles in the set.

6. The method of claim 1 wherein the image-viewing instructions specify the extent of the view of the current edited rendition of the digital image by explicitly identifying the tiles to be viewed.

7. The method of claim 1 wherein the image-viewing instructions specify the extent of the view of the current edited rendition of the digital image by identifying the region to be viewed, whereupon the addresses of all tiles intersecting the region are computed.

8. The method of claim 1 additionally comprising copying the set of image tiles sufficient to generate the current view of the current edited rendition of the archival digital image into the computer system's video display buffer so as to generate the current view of the edited rendition of the archival digital image.

9. The method as recited in claim 1 wherein the previous state is between an anchor state and a current state.

10. The method as recited in claim 1 wherein the cache of images tiles include portions of views of multiple edited renditions.

11. A computer system for interactively viewing and editing a digital image comprising:
   an electronic digital-data storage device, operative to hold a plurality of archival digital images;
   a state list, characterizing a sequence of image-editing operations to be applied
   to a given archival digital image in order to generate a current edited rendition of the digital image,
   a set of viewing data, characterizing the resolution, offset and extent at which to view the current edited rendition of the given digital image;
   a cache of image tiles comprising portions of views of edited renditions of the archival digital image, each tile identifying a state in the state list,
   a video digital display device;
   a digital video memory buffer, containing digital data displayed by the video digital display device;
   a user-input device;
   a user-input module, operative to receive signals from the user-input device and translate them into image-viewing and image-editing instructions; and
   an application module, operative to receive image-viewing and image-editing instructions from the user-input module, and
   to update the viewing data and the state list in response to the image-viewing and image-editing instructions, and
   to assemble in the system's tile cache in response to the image-viewing and image-editing instructions, a set of image tiles sufficient to generate the current view of the current edited rendition of the archival digital image by using the state list, and
   to copy the set of image tiles sufficient to generate the current view of the current edited rendition of the archival digital image into the computer system's video display buffer so as to generate the current view of the edited rendition of the archival digital image.

12. The computer System of claim 11 wherein the computer system comprises a plurality of computers connected by a network.

13. The computer system of claim 12 wherein the network is the Internet.

14. The computer system of claim 12 wherein the electronic digital-data storage device, the state list, the set of viewing data, and the cache of image tiles reside in a first server computer, wherein the video digital display device, the digital video memory buffer, the user-input devices, and the user-input module reside in a second client computer, and wherein the application module is partitioned into a server application submodule resident in the server computer and a client application submodule resident in the client's computer.

15. The computer system of claim 14 wherein the client application submodule is operative:
   to receive image-viewing and image-editing instructions from the user-input module, and
   to transmit the image-viewing and image-editing instructions to the server application submodule.

16. The computer system of claim 14 wherein the server application submodule is operative:
   to receive image-viewing and image-editing instructions from the client application submodule, and
   to update the viewing data and the state list accordingly, and
   to assemble in the tile cache, by inductive image generation and in response to image-viewing and image-editing instructions, a set of image tiles sufficient to generate the current view of the current edited rendition of the archival digital image, and
   to transmit the set of image tiles to the client applications submodule.

17. The computer system of claim 14 wherein the client application submodule is operative:
   to receive image tiles sufficient to generate the current view of the current edited rendition of the archival digital image transmitted from the server application submodule, and
   to copy the set of image tiles sufficient to generate the current view of the current edited rendition of the archival digital image into the computer system's video display buffer so as to generate the current view of the edited rendition of the archival image.

18. The computer system of claim 14 additionally comprising a second cache of image tiles residing in the client computer.

* * * * *